US010248292B2

(12) United States Patent
Murase

(10) Patent No.: US 10,248,292 B2
(45) Date of Patent: Apr. 2, 2019

(54) ELECTRONIC PICTURE BOOK WHICH SEQUENTIALLY CHANGES IN RESPONSE TO SCROLL OPERATION

(71) Applicant: Shoichi Murase, Tokyo (JP)

(72) Inventor: Shoichi Murase, Tokyo (JP)

( * ) Notice: Subject to any disclaimer, the term of this patent is extended or adjusted under 35 U.S.C. 154(b) by 0 days.

(21) Appl. No.: 15/298,088

(22) Filed: Oct. 19, 2016

(65) Prior Publication Data

US 2017/0038931 A1 Feb. 9, 2017

Related U.S. Application Data

(63) Continuation of application No. PCT/JP2015/061646, filed on Apr. 16, 2015.

(30) Foreign Application Priority Data

Apr. 20, 2014 (JP) .................. 2014-086956

(51) Int. Cl.
| | |
|---|---|
| *G06F 3/0483* | (2013.01) |
| *G06F 3/0488* | (2013.01) |
| *G06F 3/0485* | (2013.01) |
| *G09G 5/34* | (2006.01) |
| *G06T 13/80* | (2011.01) |

(52) U.S. Cl.
CPC .......... *G06F 3/0483* (2013.01); *G06F 3/0485* (2013.01); *G06F 3/0488* (2013.01); *G06T 13/80* (2013.01); *G09G 5/34* (2013.01)

(58) Field of Classification Search
CPC ................ G06F 3/0483; G06F 3/0485; A63F 2300/1075
See application file for complete search history.

(56) References Cited

U.S. PATENT DOCUMENTS

| | | | |
|---|---|---|---|
| 5,926,186 A | 7/1999 | Itoh et al. | |
| 9,619,250 B2* | 4/2017 | Gentile | G06F 9/4446 |
| 9,928,218 B2* | 3/2018 | Cranfill | G06F 17/30011 |
| 2005/0211080 A1* | 9/2005 | Ueshima | A63F 13/00 |
| | | | 84/724 |

(Continued)

FOREIGN PATENT DOCUMENTS

| | | |
|---|---|---|
| JP | 696186 A | 4/1994 |
| JP | H0696186 A | 4/1994 |

(Continued)

*Primary Examiner* — Alvin H Tan
(74) *Attorney, Agent, or Firm* — EIP US LLP

(57) ABSTRACT

In the prior art, in electronic picture books having a functionality in which scrolling is performed such that an image seems to be moved when a screen is stroked by a hand, it has not been possible to achieve a special representation that greatly surprises the reader by using the scroll functionality. To solve this problem, provided herein is an electronic picture book in which a partial range of an image is displayed and a display range of the image changes due to the screen being stroked by a hand, shapes, colors, and special effects of element images sequentially change in coordination with change to the display range, and a manner and an extent of the change differ depending on the element image. Moreover, the shapes, colors, and special effects of these element images also undergo a different change in coordination with elapsing of time.

14 Claims, 16 Drawing Sheets

(56) References Cited

U.S. PATENT DOCUMENTS

2012/0236201 A1* 9/2012 Larsen .................. G06Q 10/10
          348/468
2013/0210524 A1   8/2013 Otani et al.
2016/0203113 A1* 7/2016 Doherty ............. G06F 17/2247
          715/240

FOREIGN PATENT DOCUMENTS

| JP | H11-192383 A | 7/1999 |
| JP | 200075986 A | 3/2000 |
| WO | 2007069383 A1 | 6/2007 |
| WO | 2015163220 A1 | 10/2015 |

* cited by examiner (Movie Produced by Polygoon-Profilti)

$$511 \begin{cases} \vec{q} = (\vec{AB} \cdot \vec{p}) / |\vec{AB}|^2 \\ P(q) = a \times (1-q) + b \times q \end{cases}$$

$$567 \begin{cases} \vec{p} = \vec{AB} \times t + \vec{AC} \times u \\ P(t, u) = a \times (1-t-u) + b \times t + c \times u \end{cases}$$

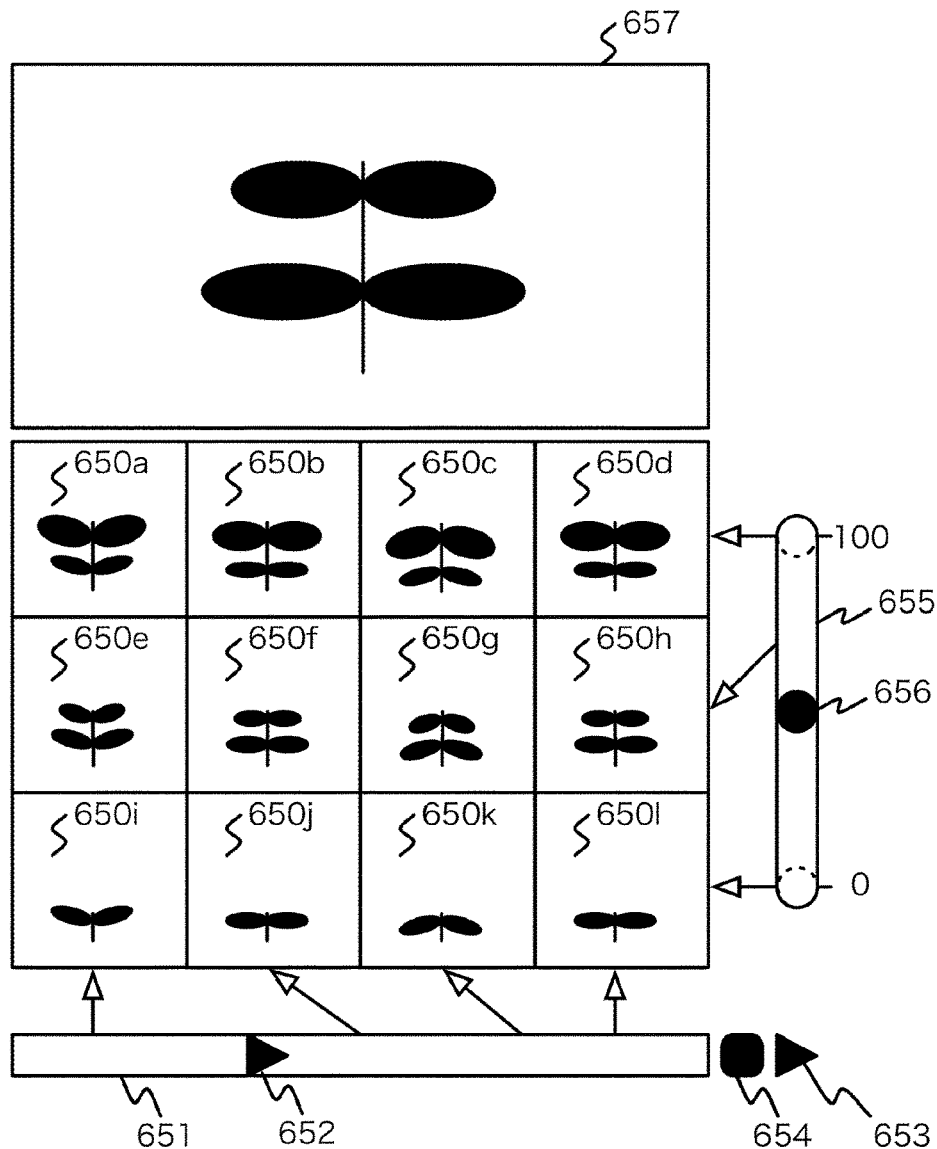

900
<map_func>linear, x1, y1, x2, y2</function>

903
<map_func>oval, x1, y1, w, h</function>

901 $\begin{cases} \vec{a} = (x - x1, y - y1) \\ \vec{b} = (x2 - x1, y2 - y1) \\ n = \begin{cases} \vec{a} \cdot \vec{b} / |\vec{a}||\vec{b}| & (|\vec{a}| \neq 0 \text{かつ} |\vec{b}| \neq 0) \\ 0 & (|\vec{a}| = 0 \text{または} |\vec{b}| = 0) \end{cases} \end{cases}$ 902 $value = \begin{cases} n & (0 \leq n \leq 1) \\ 0 & (n < 0) \\ 1 & (n > 1) \end{cases}$ 904 $n = 1 - \sqrt{\left(\frac{x - x1}{w}\right)^2 + \left(\frac{y - y1}{h}\right)^2}$ 905 $value = \begin{cases} n & (0 \leq n \leq 1) \\ 0 & (n < 0) \end{cases}$

FIG. 16

```
             <scroll_picture> 700      703
              <element> 701
      702   <variate_type>contorol_point_still</variate_type>
      704   <variation>        706
        705    <scroll_position>100, 100</scroll_position>
                    708  709
        707    <effect>blur, 10</effect>
                    711    712
        710    <color id=1001>50, 100, 50</color>
                    714    715
        713    <shape id=1002>150, 90, 170, 100, 150, 110, 130, 100, 150, 90</shape>
                    :
               </variation>
               <variation>
                  <scroll_position>200, 100</scroll_position>
       707a    <effect>blur, 20</effect>
       710a    <color id=1001>40, 75, 40</color>
       713a    <shape id=1002>150, 80, 190, 100, 150, 120, 110, 100, 150, 80</shape>
                    :
               </variation>
                    :
             </element>
                    :              722
              <element> 720
       721   <variate_type>density_map_still</variate_type>
                          724
       723   <map>map_data1.jpeg</map>
       725   <variation>      727
         726    <map_value>0</map_value>
         728    <effect>blur, 10</effect>
         729    <color id=6001>50, 100, 50</color>
         730    <shape id=6002>650, 90, 670, 100, 650, 110, 630, 100, 650, 90</shape>
                    :
               </variation>
       725a   <variation>
       726a    <map_value>50</map_value>
       728a    <effect>blur, 20</effect>
       729a    <color id=6001>40, 75, 40</color>
       730a    <shape id=6002>650, 80, 690, 100, 650, 120, 610, 100, 650, 80</shape>
                    :
               </variation>
                    :
             </element>
                    :
```

FIG. 17

```
                    :                    742
         <element> ~740              ~
741 ~  <variate_type>control_point_movie</variate_type>
                       ~744
743 ~  <duration>10000</duration>
745 ~  <variation>           ~747
746 ~      <scroll_position>200,200</scroll_position>
                 ~749
748 ~      <time>0</time>
750 ~      <effect>blur, 10</effect>
751 ~      <color id=2001>50, 100, 50</color>
752 ~      <shape id=2002>250, 190, 270, 200, 250, 210, 230, 200, 250, 190</shape>
                       :
       </variation>
745a ~ <variation>
           <scroll_position>200,200</scroll_position>
           <time>500</time>
           <effect>blur, 5</effect>
           <color id=2001>60, 90, 60</color>
           <shape id=2002>250, 190, 268, 190, 250, 210, 232, 210, 250, 190</shape>
                       :
       </variation>
745b ~ <variation>
           <scroll_position>300,200</scroll_position>
           <time>0</time>
           <effect>blur, 20</effect>
           <color id=2001>40, 75, 40</color>
           <shape id=2002>250, 180, 290, 200, 250, 220, 210, 200, 250, 180</shape>
                       :
       </variation>
745c ~ <variation>
           <scroll_position>300,200</scroll_position>
           <time>500</time>
           <effect>blur, 15</effect>
           <color id=2001>55, 65, 55</color>
           <shape id=2002>250, 180, 284, 186, 250, 220, 216, 214, 250, 180</shape>
                       :
       </variation>
                    :
       </element>
                    :
```

FIG. 18

```
        :
    <element>  ~760           762
761 ~ <variate_type>density_map_movie</variate_type>
763 ~ <map>map_data3.jpeg</map>
764 ~ <duration>10000</duration>
765 ~ <variation>
                    ~768
766 ~   <map_value>0</map_value>
                    ~769
767 ~   <time>0</time>
        <effect>blur, 10</effect>
        <color id=7001>50, 100, 50</color>
        <shape id=7002>750, 90, 770, 100, 750, 110, 730, 100, 750, 90</shape>
            :
765a ~ </variation>
       <variation>
        <map_value>0</map_value>
        <time>500</time>
        <effect>blur, 5</effect>
        <color id=7001>60, 90, 60</color>
        <shape id=7002>750, 90, 768, 90, 750, 110, 732, 110, 750, 90</shape>
            :
765b ~ </variation>
       <variation>
        <map_value>50</map_value>
        <time>0</time>
        <effect>blur, 20</effect>
        <color id=7001>40, 75, 40</color>
        <shape id=7002>750, 80, 790, 100, 750, 120, 710, 100, 750, 80</shape>
            :
765c ~ </variation>
       <variation>
        <map_value>50</map_value>
        <time>500</time>
        <effect>blur, 15</effect>
        <color id=7001>55, 65, 55</color>
        <shape id=7002>750, 80, 784, 86, 750, 120, 716, 114, 750, 80</shape>
            :
       </variation>
            :
    </element>
        :
```

FIG. 19

```
        :
    <element>
        <variate_type>contorol_point_still</variate_type>
780    <variation>         782
781    <scroll_position>300, 300</scroll_position>
783    <effect>blur, 10</effect>
                              785      787
784    <movie_file>350, 300, 1, movie_file_1.mpeg</movie_file>
                          :   786
        </variation>
780a   <variation>
        <scroll_position>400, 300</scroll_position>
        <effect>blur, 20</effect>
784a   <movie_file>350, 300, 50, movie_file1.mpeg</movie_file>
                          :
        </variation>
                :
    </element>
        :
    <element>   790
        <variate_type>density_map_still</variate_type>
791    <map>map_data2.jpeg</map>
792    <variation>
        <map_value>0</map_value>
793    <effect>blur, 10</effect>
        <movie_file>650, 300, 1, movie_file2.mpeg</movie_file>
794                :
        </variation>
792a   <variation>
        <map_value>100</map_value>
793a   <effect>blur, 20</effect>
        <movie_file>650, 300, 200, movie_file2.mpeg</movie_file>
794a              :
        </variation>
            :
    </element>
        :
    <element>   800
        <variate_type>density_map_still</variate_type>
801    <map>map_data3.jpeg</map>
802    <movie_file>800, 300, movie_file3.mpeg</movie_file>
        </element>
            :
    <element>   810
        <variate_type> density_map_still</variate_type>
          813              814
811    <map_func>linear, 700, 500, 900, 700</map_func>
812    <movie_file>800, 600, movie_file3.mpeg</movie_file>
        </element>
            :
```

FIG. 20

```
        :
    <element>
        <variate_type>contorol_point_still</variate_type>
820     <variation>
            <scroll_position>400, 100</scroll_position>
                      822  823   825
821         <effect>particle, 23, 240, 10, 0, 0, 2, 4, 0, 6, -2, 4, 0, 0</effect>
                              824                    826
            <color id=4001>50, 100, 50</color>
            <shape id=4002>450, 90, 470, 100, 450, 110, 430, 100, 450, 90</shape>
              :
        </variation>
820a    <variation>
            <scroll_position>500, 100</scroll_position>
821a        <effect>particle, 4, 270, 5, 0, 0, 2, 3, 0, 5, -2, 3, 0, 0</effect>
            <color id=4001>40, 75, 40</color>
            <shape id=4002>450, 80, 490, 100, 450, 120, 410, 100, 450, 80</shape>
              :
        </variation>
          :
    </element>
    <element>   840
        <variate_type>density_map_movie</variate_type>
        <duration>10000</duration>
841     <map_func>oval, 550, 200, 200, 100</map_func>
842     <variation>
843         <map_value>0</map_value>
                                        827
844         <effect>particle, 23, 240, 10, particle_shape1.jpeg</effect>
            <color id=5001>50, 100, 50</color>
            <shape id=5002>550, 190, 570, 200, 550, 210, 530, 200, 550, 190</shape>
              :
        </variation>
842a    <variation>
843a        <map_value>0.5</map_value>
844a        <effect>particle, 4, 270, 5, particle_shape1.jpeg</effect>
            <color id=5001>60, 90, 60</color>
            <shape id=5002>550, 190, 568, 190, 550, 210, 532, 210, 550, 190</shape>
              :
        </variation>
          :
    </element>
      :
</scroll_picture>
```

ELECTRONIC PICTURE BOOK WHICH SEQUENTIALLY CHANGES IN RESPONSE TO SCROLL OPERATION

CROSS-REFERENCE TO RELATED APPLICATIONS

This application is a continuation of International Application No. PCT/JP2015/061646, filed Apr. 16, 2015, which claims priority to Japanese Application No. JP 2014-086956, filed Apr. 20, 2014. Each of the above-referenced patent applications is hereby incorporated by reference in its entirety.

BACKGROUND OF THE INVENTION

Field of the Invention

This application relates to an electronic picture book that advances reading by showing an image on a screen of a computer.

Description of the Related Technology

Electronic picture books that display contents of a picture book on a screen of a computer as images and advance reading are widely known. Such electronic picture books emulate picture books made from paper, and are designed such that any person familiar with picture books made from paper will quickly understand how to read them. More specifically, such electronic picture books are given functionality for turning pages in a similar manner to in picture books made from paper, and reading of the electronic picture book can be advanced as pages are turned.

There are also electronic picture books that utilize features of computers to provide animation functionality and interactivity functionality. In electronic picture books provided with animation functionality, some pictures are displayed as animations. In electronic picture books provided with interactivity functionality, some of the pictures, for example, move as an animation or emit a sound effect when an operation such as a mouse click is performed.

Such electronic picture books are explained in Patent Document 1 (Japanese Patent Application Laid-Open (JP-A) No. 2010-39851), for example.

In recent years, tablet terminals that employ displays equipped with touch panels are becoming widespread. Such tablet terminals include functionality to cause scrolling by vertically stroking the touch panel by hand when viewing webpages or document files, such that the webpage or document moves vertically as if moved by the hand.

Although remarkably few in number, electronic picture books have appeared in which a display equipped with a touch panel is used to read while scrolling.

Examples of such electronic picture books include "Akaimaru-chan (Round RED)" by HONGO Inc. These electronic picture books invoke page delivery functionality for advancing to the next page when the touch panel is stroked by hand, and operate so as to align two pages side-by-side and slide the two pages as if the previous page and the next page are sequential pages. Accordingly, if the hand is taken away, movement automatically proceeds to the next page and then stops.

Up to now, electronic picture books have had a problem in that even though functionality has been achieved for scrolling by modifying a display range such that images appear to be moved by stroking the screen by hand, which is a particular feature of tablet terminals that employ a display equipped with a touch panel, to give an easily understood representation of the fact that pages are sequential, it has not been possible to achieve a special representation of this fact so as to greatly surprise the reader.

It is conceivable that a large reason for this is the lack of a program to produce an electronic picture book, or electronic data to represent an electronic picture book, capable of simple linking scrolling with a special representation of the electronic picture book, and the invention also aims to solve this problem.

Related art includes Japanese Application No. 2010-39851 and Japanese Patent No. 4563440.

SUMMARY

According to a first embodiment of the invention, there is provided an electronic picture book in which a partial range of an overall image is displayed on a screen, and a display range changes as if the image is being moved vertically or horizontally due to the screen being stroked by a hand. The electronic picture book is configured by plural element images, shapes or colors of the element images sequentially change in coordination with change to the display range due to the electronic picture book scrolling, and a manner and an extent of the change differ for each element image.

Some embodiments may comprise configurations such that the shapes or colors of these element images change with the elapse of time, and also undergo a different change in coordination with changes to the display range.

Some embodiments may comprise configurations such that these element images are made from video data that records changes to shapes or colors for each element image separately, and one frame is selected from the video data and displayed in coordination with change to the display range.

Some embodiments may comprise configurations such that these element images each separately change with the elapse of time in accordance with a physics simulation, and a variable employed in a calculation of the physics simulation changes in coordination with change to the display range.

Some embodiments may comprise configurations such that a program that produces these electronic picture books is provided with a preview screen enabling the display range to be changed and change to element images to be confirmed, displays the display range at two or more places and designates shapes or colors of element images for each of the respective display ranges; and produces the element images so as to sequentially change via interpolation there between.

Some embodiments may comprise configurations such that the program that produces these electronic picture books designates for each element image a function that converts vertical-horizontal two-dimensional position information of the display range into a single variable value.

Some embodiments may comprise configurations such that the program that produces these electronic picture books represents changes to each element image on two axes of an axis indicating elapse of time and an axis indicating a display range, designates plural places on the two axes, designates a shape or color for each of the element images, and interpolates in two dimensions formed by the two axes.

Some embodiments may comprise configurations such that in electronic data that represents these electronic picture books or represents an electronic picture book employed by a program that produces electronic picture books, for each element image, the electronic data includes plural sets that each include data indicating a display range and data representing a shape or color of an element image when at that display range.

According to a second embodiment, electronic data that represents these electronic picture books or represents an electronic picture book employed by a program that produces electronic picture books, for each element image, the electronic data includes data indicating a function for converting vertical-horizontal two-dimensional position information of a display range into a single variable value, and plural sets that each include data indicating a variable value obtained by converting using the function and data indicating a shape or color of an element image when at that variable value.

Some embodiments may comprise configurations such that in electronic data that represents these electronic picture books or represents an electronic picture book employed by a program that produces electronic picture books, for each element image, the electronic data includes plural sets that each include data indicating a display range, data indicating an elapsed time, and data indicating a shape or color of the element image when at that display range and at that elapsed time.

Some embodiments may comprise configurations such that in electronic data that represents these electronic picture books or represents an electronic picture book employed by a program that produces electronic picture books, for each element image, the electronic data includes data indicating a function for converting vertical-horizontal two-dimensional position information of a display range into a single variable value, and plural sets that each include data indicating a variable value obtained by converting using the function, data representing an elapsed time, and data indicating a shape or color of an element image when at that variable value at that elapsed time.

Some embodiments may comprise configurations such that in electronic data that represents these electronic picture books or represents an electronic picture book employed by a program that produces electronic picture books, for each element image, the electronic data includes data designating video data, and plural sets that each include data indicating a display range, and data representing a frame position of the video data when at that display range.

Some embodiments may comprise configurations such that in electronic data that represents these electronic picture books or represents an electronic picture book employed by a program that produces electronic picture books, for each element image, the electronic data includes data designating video data, and data representing a function for converting vertical-horizontal two-dimensional position information of a display range into a single variable value, and the variable value obtained by converting using the function represents a frame position of the video data.

Some embodiments may comprise configurations such that in electronic data that represents these electronic picture books or represents an electronic picture book employed by a program that produces electronic picture books, for each element image, the electronic data includes plural sets that each include data indicating a display range, and data indicating a variable employed by a calculation in a physics simulation of the element image when at that display range.

Some embodiments may comprise configurations such that in electronic data that represents these electronic picture books or represents an electronic picture book employed by a program that produces electronic picture books, for each element image, the electronic data includes data representing a function for converting vertical-horizontal two-dimensional position information of a display range into a single variable value, and plural sets that each include data indicating a variable value obtained by converting using the function and data indicating a variable employed by a calculation in a physics simulation of the element image when at that variable value.

Some embodiments may comprise configurations that allow shapes or colors of the element images to sequentially change in coordination with change to the display range due to the electronic picture book scrolling, and a manner and an extent of the change differ for each element image, achieving a special representation so as to surprise the reader.

Some embodiments may comprise configurations such that the shapes or colors of these element images change with the elapse of time, and also undergo a different change in coordination with changes to the display range, achieving a higher level of representation.

Some embodiments may comprise configurations such that the plural element images are made from video data that records changes to shapes or colors for each element image separately, and one frame is selected from the video data and displayed in coordination with change to the display range such that the element images are able to be produced using a commonplace video production program. This enables various representations employed in video production programs to be reused in representations of electronic picture books that change in coordination with scrolling.

Some embodiments may comprise configurations such that the element images each separately change with the elapse of time in accordance with a physics simulation, and a variable employed in a calculation of the physics simulation changes in coordination with change to the display range, and this achieves a higher level of representation in which changes to shapes or colors of the element images are coordinated with both scrolling and the elapse of time.

Some embodiments may comprise configurations such that the program that produces these electronic picture books is provided with a preview screen enabling confirmation of change to the display range, displays the display range at two or more places, and designates shapes or colors of element images for each of the respective display ranges, and produces the element images so as to sequentially change via interpolation there between. This enables scrolling to be easily linked to a special representation of an electronic picture book.

Some embodiments may comprise configurations such that the program that produces these electronic picture books includes functionality to designate for each element image a function that converts vertical-horizontal two-dimensional position information of the display range into a single variable value, and this enables simple designation of changes to the element image in coordination with complex vertical-horizontal changes to the display range in one dimension using the variable value.

Some embodiments may comprise configurations such that the program that produces these electronic picture books displays changes to each element image on two axes of an axis indicating elapse of time and an axis indicating a display range, designates plural places on the two axes, designates a shape or color for each of the element images, and interpolates in two dimensions formed by the two axes. This enables simple designation of changes to the element images in coordination with both scrolling and elapse of time.

Some embodiments may comprise configurations such that in electronic data that represents these electronic picture books or represents an electronic picture book employed by a program that produces electronic picture books, for each element image, the electronic data includes plural sets that each include data indicating a display range and data representing a shape or color of an element image when at that display range. This enables simple representation of the electronic picture book.

Some embodiments may comprise configurations such that, in electronic data that represents these electronic picture books or represents an electronic picture book employed by a program that produces electronic picture books, for each element image, the electronic data includes data indicating a function for converting vertical-horizontal two-dimensional position information of a display range into a single variable value, and plural sets that each include data indicating a variable value obtained by converting using the function and data indicating a shape or color of an element image when at that variable value. This enables more simple representation of the electronic picture book.

Some embodiments may comprise configurations such that, in electronic data that represents these electronic picture books or represents an electronic picture book employed by a program that produces electronic picture books, for each element image, the electronic data includes plural sets that each include data indicating a display range, data indicating an elapsed time, and data indicating a shape or color of the element image when at that display range and at that elapsed time. This enables simple representation of the electronic picture book in which element images change in coordination with both scrolling and elapse of time.

Some embodiments may comprise configurations such that, in electronic data that represents these electronic picture books or represents an electronic picture book employed by a program that produces electronic picture books, for each element image, the electronic data includes data indicating a function for converting vertical-horizontal two-dimensional position information of a display range into a single variable value, plural sets that each include data indicating a variable value obtained by converting using the function, data representing an elapsed time, and data indicating a shape or color of an element image when at that variable value at that elapsed time. This enables simple representation of the electronic picture book.

Some embodiments may comprise configurations such that, in electronic data that represents these electronic picture books or represents an electronic picture book employed by a program that produces electronic picture books, for each element image, the electronic data includes data designating video data, and plural sets that each include data indicating a display range, and data representing a frame position of the video data when at that display range. This enables simple representation of the electronic picture book which reuses video data.

Some embodiments may comprise configurations such that, in electronic data that represents these electronic picture books or represents an electronic picture book employed by a program that produces electronic picture books, for each element image, the electronic data includes data designating video data, and data representing a function for converting vertical-horizontal two-dimensional position information of a display range into a single variable value, and the variable value obtained by converting using the function represents a frame position of the video data. This enables simple representation of the electronic picture book.

Some embodiments may comprise configurations such that, in electronic data that represents these electronic picture books or represents an electronic picture book employed by a program that produces electronic picture books, for each element image, the electronic data includes plural sets that each include data indicating a display range, and data indicating a variable employed by a calculation in a physics simulation of the element image when at that display range. This enables simple representation of the electronic picture book in which the element images change in coordination with both scrolling and elapse of time.

Some embodiments may comprise configurations such that, in electronic data that represents these electronic picture books or represents an electronic picture book employed by a program that produces electronic picture books, for each element image, the electronic data includes data representing a function for converting vertical-horizontal two-dimensional position information of a display range into a single variable value, and plural sets that each include data indicating a variable value obtained by converting using the function and data indicating a variable employed by a calculation in a physics simulation of the element image when at that variable value. This enables simple representation of the electronic picture book.

Further features and advantages of the invention will become apparent from the following description of embodiments of the invention, given by way of example only, which is made with reference to the accompanying drawings.

BRIEF DESCRIPTION OF THE DRAWINGS

FIG. 15 illustrates a program for producing electronic picture books according to one or more embodiments of the present invention.

FIG. 16 illustrates electronic data to implement an electronic picture book according to one or more embodiments of the present invention.

FIG. 17 illustrates electronic data to implement an electronic picture book according to one or more embodiments of the present invention.

FIG. 18 illustrates electronic data to implement an electronic picture book according to one or more embodiments of the present invention.

FIG. 19 illustrates electronic data to implement an electronic picture book according to one or more embodiments of the present invention.

FIG. 20 illustrates electronic data to implement an electronic picture book according to one or more embodiments of the present invention.

FIG. 21 illustrates a function equation for converting two-dimensional position information into a single variable value according to one or more embodiments of the present invention.

DETAILED DESCRIPTION OF CERTAIN INVENTIVE EMBODIMENTS

Figure 1:
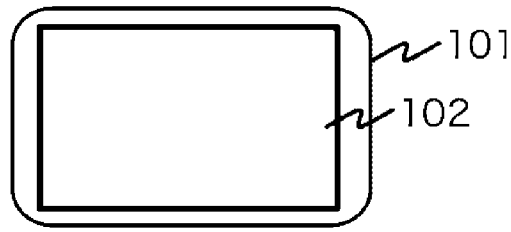
FIG. 1 illustrates an exterior view of an electronic device for reading electronic picture books of the invention.

FIG. 1 is an exterior view of an electronic device for reading electronic picture books of the invention. A touch panel-equipped display 102 is incorporated into a casing 101.

Figure 2:
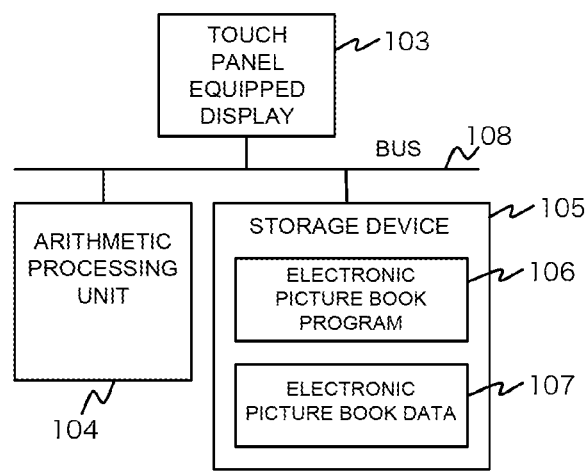
FIG. 2 illustrates a configuration of an electronic device for reading electronic picture books of the invention.

FIG. 2 is a configuration diagram of an electronic device for reading electronic picture books of the invention. The electronic device includes a touch panel-equipped display 103, an arithmetic processing unit 104, and a storage device 105. An electronic picture book program 106 and electronic picture book data 107 for implementing the invention are stored in the storage device 105. The touch panel-equipped display 103, the arithmetic processing unit 104, and the storage device 105 are connected by, and communicate via, a bus 108. Under instruction by the electronic picture book program 106, the arithmetic processing unit 104 acquires information from the touch panel-equipped display 103 indicating that the touch panel-equipped display 103 was stroked by the hand of the reader of the electronic picture book, generates display images from the electronic picture book data 107, and displays the generated display images on the touch panel-equipped display 103.

Figure 3:
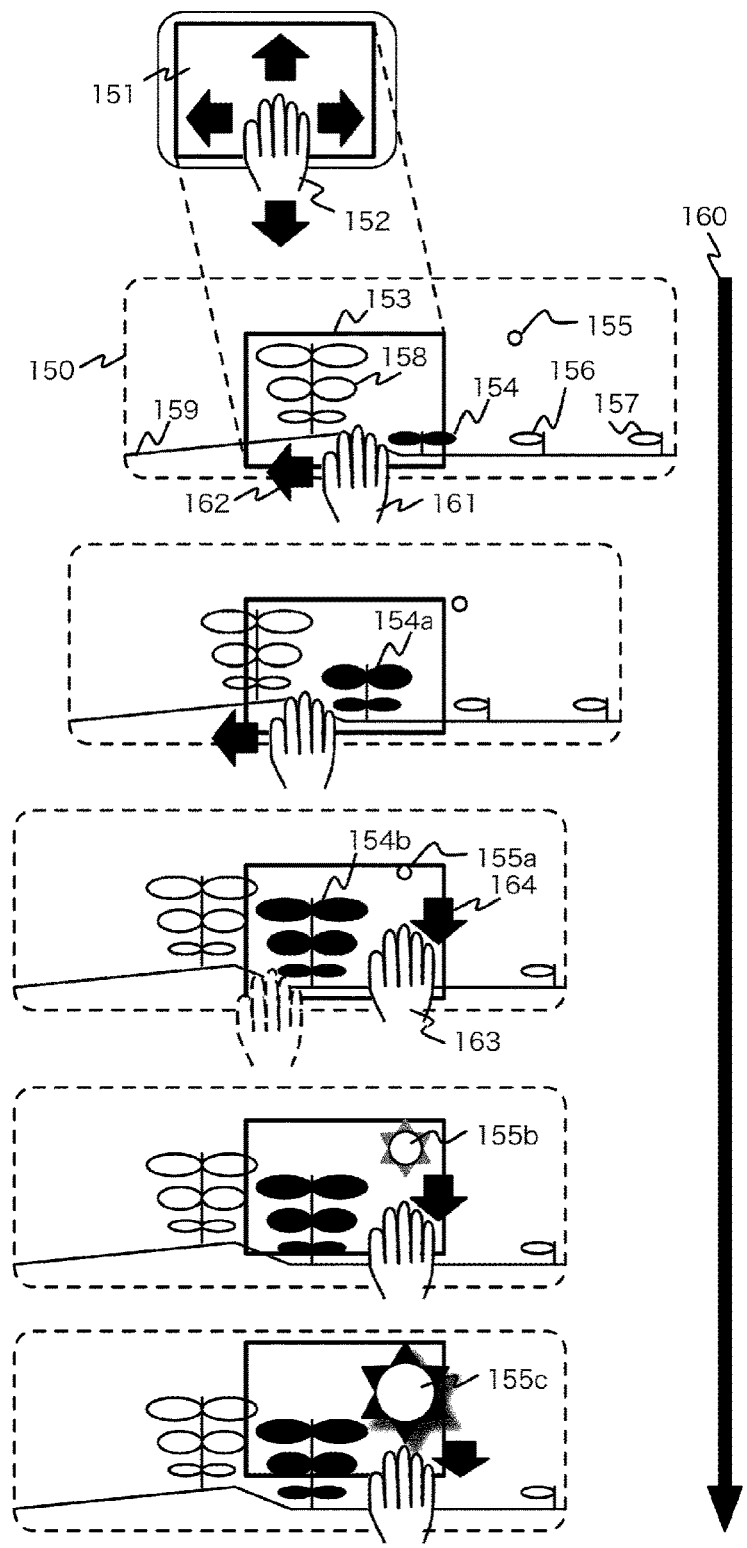
FIG. 3 is an electronic picture book according to one or more embodiments of the present invention.

FIG. 3 illustrates an exemplary embodiment of claim 1. An electronic picture book 150 of the invention is bigger than a touch panel-equipped display 151, and the reader strokes the touch panel-equipped display 151 up, down, left, or right with their hand 152 so that a display range 153 of the electronic picture book 150 changes in coordination with their hand movement, as if the electronic picture book 150 is being moved by their hand. A feature of the invention is that the electronic picture book 150 is made up of plural element images 154 to 159, and, by stroking the touch panel-equipped display 151 by the hand 152, the shapes and colors of the element images 154 to 159 being displayed sequentially change, separately for each element image, in coordination with changes to the display range 153. The manners in which the element images 154 to 159 change differ to match the meanings expressed by the element images 154 to 159. The reader can thus experience dynamic image changes coordinated with operations to scroll the electronic picture book 150 by stroking the touch panel-equipped display 151 by hand.

The example of FIG. 3 illustrates a state in which, along a time axis 160, the shape of the element image 154 representing a flowering plant gradually grows from having two leaves 154, to having four leaves 154a, and then to having six leaves 154b as the display range 153 moves right due to the touch panel-equipped display 151 first being stroked to the left 162 by a hand 161. The example also illustrates a state in which the shape and color of the element image 155 representing the sun gradually grows larger from a point 155a at first, to being a small weak sun 155b, to being a large sun 155c with a dark shadow, as the display range 153 is moved upward by then stroking the touch panel-equipped display 151 in the downward direction 164 with a hand 163. In this manner, the element images 154, and 154a to 154b, and the element images 155, and 155a to 155c are displayed simultaneously, but they each differ in the manner in which they change and the extent of the change. Moreover, since the changes to the element images 154 to 159 are coordinated with the movement of the hands 152, 161, 163, if the hand is moved fast, the changes to the element images 154 to 159 are also fast so as to match the fast movement, and if the hand is moved slowly, the changes to the element images 154 to 159 are also slow so as to match the slow movement. Shapes and colors of the element images 154 to 159 are essentially the same if the display range 153 is the same. Configuration may also be made such that when the hand is moved extremely rapidly, the speed of changes is suppressed to be no greater than a specific speed and the changes reach completion with some delay, such that the course of changes in the element images 154 to 159 is easily perceived.

Figure 4:
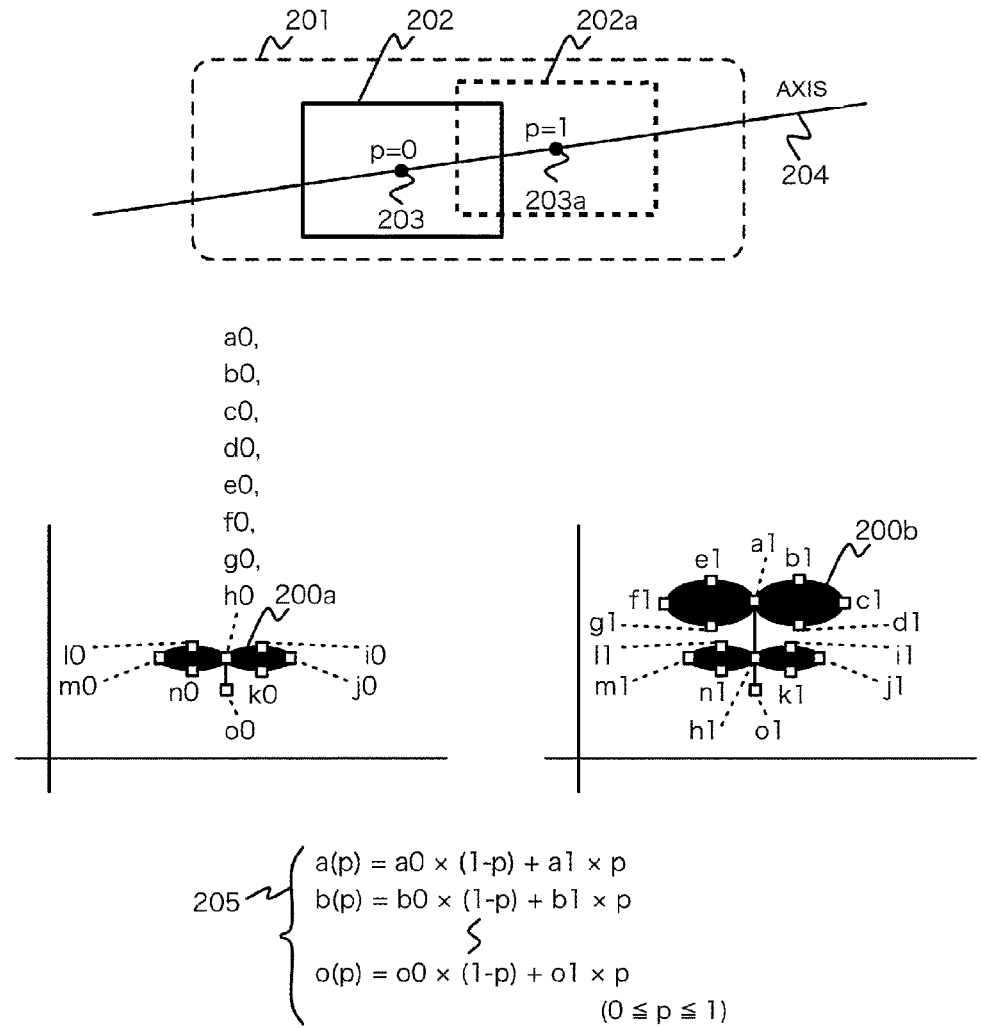
FIG. 4 illustrates details of a manner of change in an element image of an electronic picture book according to one or more embodiments of the present invention.

FIG. 4 illustrates an example of the details of the manner in which the element images of FIG. 3 change. In FIG. 4, the shape of an element image changes depending on the position of the center 203 of a display range 202 of an electronic picture book 201 on a designated axis 204. The position is represented by a variable p. The shape of the element image at instant 203, at which p=0 for the display range 202 on the axis 204, is represented by a0, b0, . . . , o0 (200a), and the shape of the element image at instant 203a, at which p=1, is represented by a1, b1, . . . , o1 (200b). Note that a0, . . . , o0, a1, . . . , o1 indicate coordinates on the electronic picture book 201. As the value of p for the display range 202 on the axis 204 gradually changes from 0 to 1, the shape of the element image becomes a(p), b(p), . . . , o(p) as expressed by an equation 205, and the shape changes gradually and sequentially. Similarly, values designating colors and special effects, including physics simulations explained below, are calculated such that there is a gradual and sequential change between the two display ranges 202 and 202a. The calculation method is a method known as linear interpolation, but the interpolation may employ a different method. Moreover, the manner in which the plural element images change in coordination with changes to the display range can be respectively modified by modifying the axis 204 for each element image.

Figure 5:
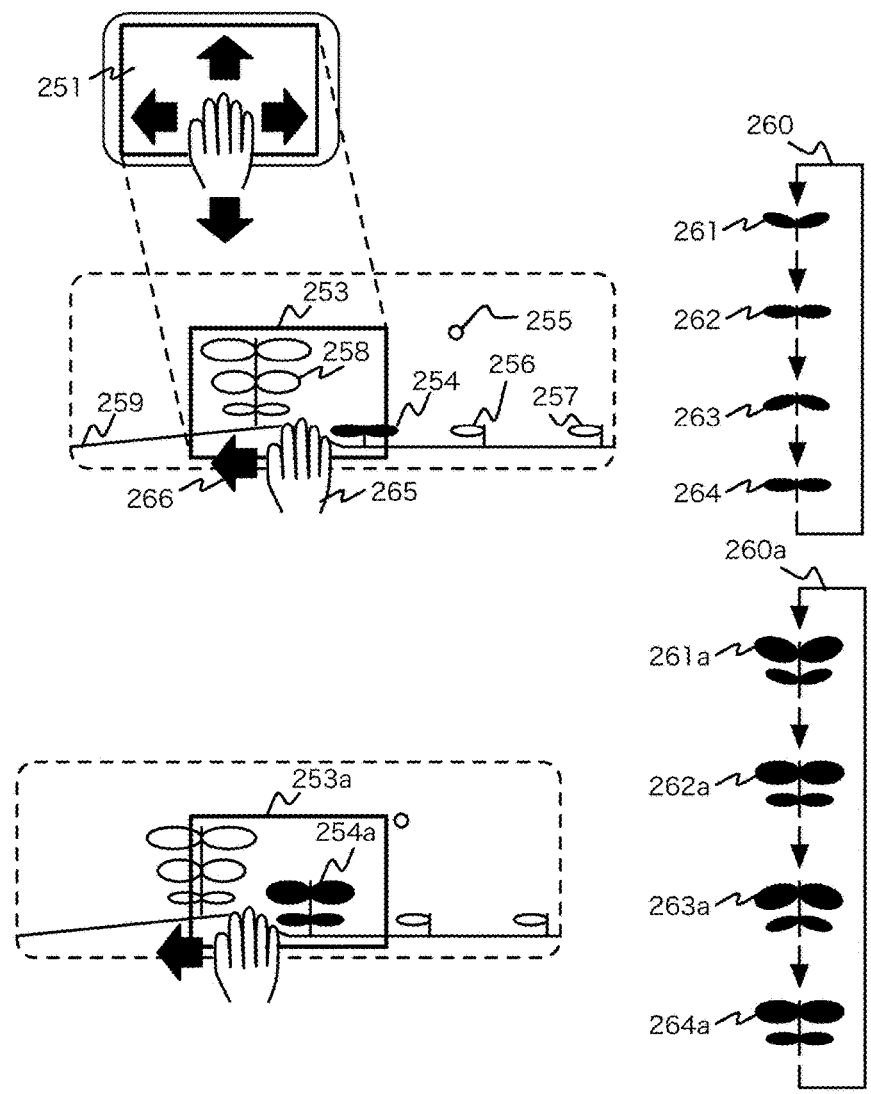
FIG. 5 illustrates an electronic picture book according to one or more embodiments of the present invention.

FIG. 5 illustrates an exemplary embodiment of claim 2. In contrast to FIG. 3, the element images 254 to 259 of FIG. 5 change sequentially with the elapse of time, even when a display range 253 is fixed. The element image 254 has two leaves at the display range 253 at the top of FIG. 3, and changes such that the leaves sway up and down in the sequence of the arrow 260 with the elapse of time (261 to 264). When the display range 253a at the bottom of FIG. 3 is moved by stroking the touch panel-equipped display 251 to the left 266 by a hand 265, the element image 254 gradually becomes four leaves 254a, and changes such that the leaves sway up and down in the sequence of the arrow 260a with the elapse of time (261a to 264a). This enables the reader to experience more dynamic image changes due to the element image 254 changing in this manner such that the leaves sway up and down with the elapse of time (261 to 264) while the number of leaves also gradually increases in coordination with changes to the display range 253 (from 254 to 254a, from 261 to 261a, . . . , from 264 to 264a).

Figure 6:
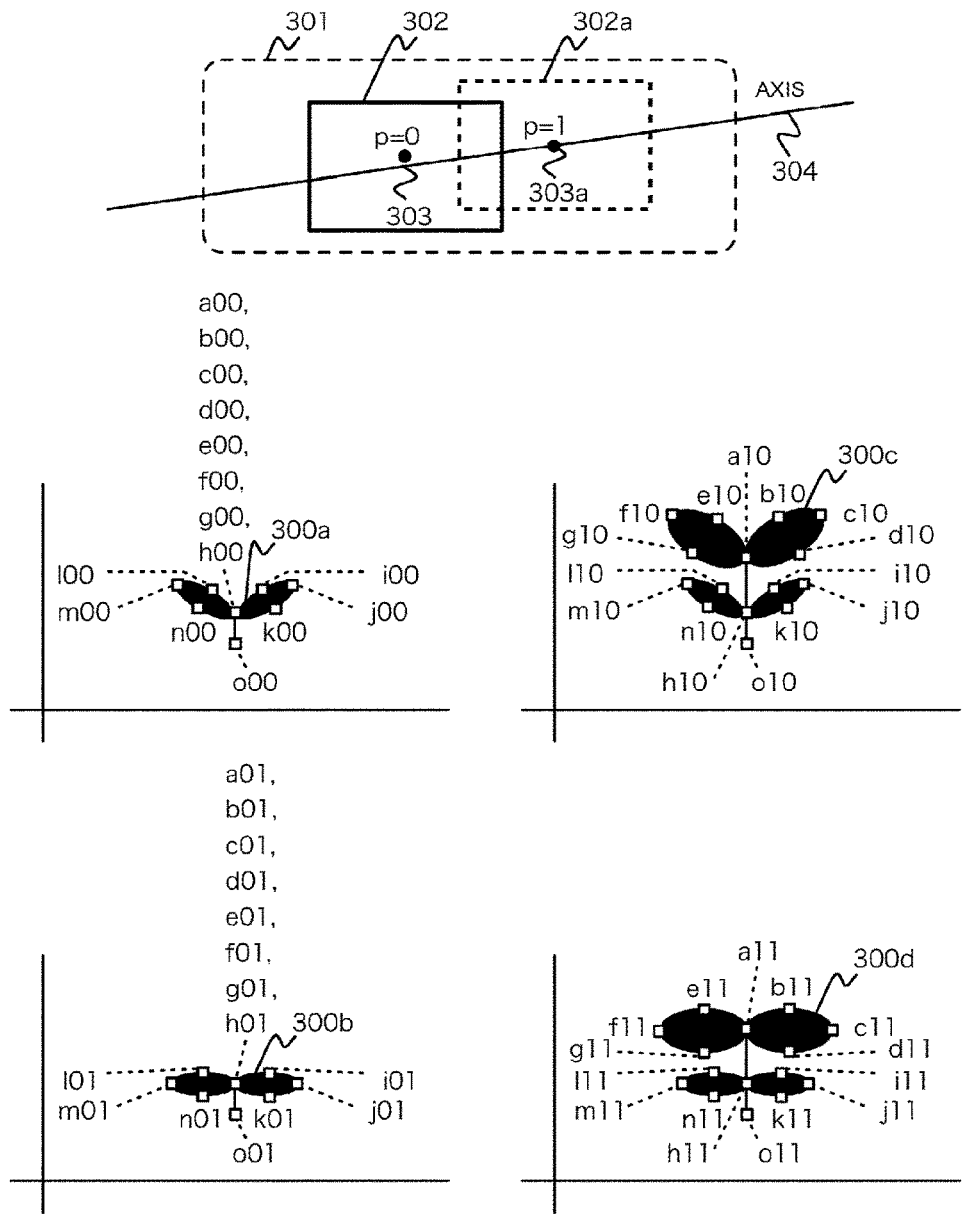
FIG. 6 illustrates details of a manner of change in an element image of an electronic picture book according to one or more embodiments of the present invention.

FIG. 6 is an example of the details of the manner in which the element images of FIG. 5 change. In FIG. 6, the shape of the element image changes depending on the elapse of time and on the position of a center 303 of a display range 302 of an electronic picture book 301 on a designated axis 304. The elapsed time is represented by a variable t, and the position of the display range 302 is represented by a variable p. Here, the time t oscillates between 0 and 1, transitioning from 0 to 1 and from 1 to 0, at fixed time intervals such as 1 second. The shape of the element image at the time when t=0 is represented by a00, b00, . . . , o00 (300a) when the display range 302 is at p=0 (303) on the axis 304, the element image at the time when t=1 is represented by a01, b01, . . . , o01 (300b) at p=0, the element image at the time when t=0 is represented by a10, b10, . . . , o10 (300c) at p=1 (303a), and the element image at the time when t=1 is represented by a11, b11, . . . , o11 (300d) at p=1. Note that a00, . . . , o00, a01, . . . , o01, a10, . . . , o10, and a11, . . . , o11 represent coordinates on the electronic picture book 301. As the value of t gradually changes between 0 and 1 with the elapse of time, and as the value of p for the display range 302 on the axis 304 gradually changes from 0 to 1, the shape of the element image becomes a(p, t), b(p, t), . . . , o(p, t) as expressed by an equation 305, and the shape changes gradually and sequentially. Similarly, values designating colors and special effects, including physics simulations explained below, are calculated such that there is a change with time and a gradual and sequential change between the two display ranges 302 and 302a. The calculation method is an interpolation method that employs two variables. Moreover, the manners in which the plural element images change in coordination with change in time and in coordination with changes to the display range can be respectively modified by modifying the axis 304 for each element image.

Figure 7:
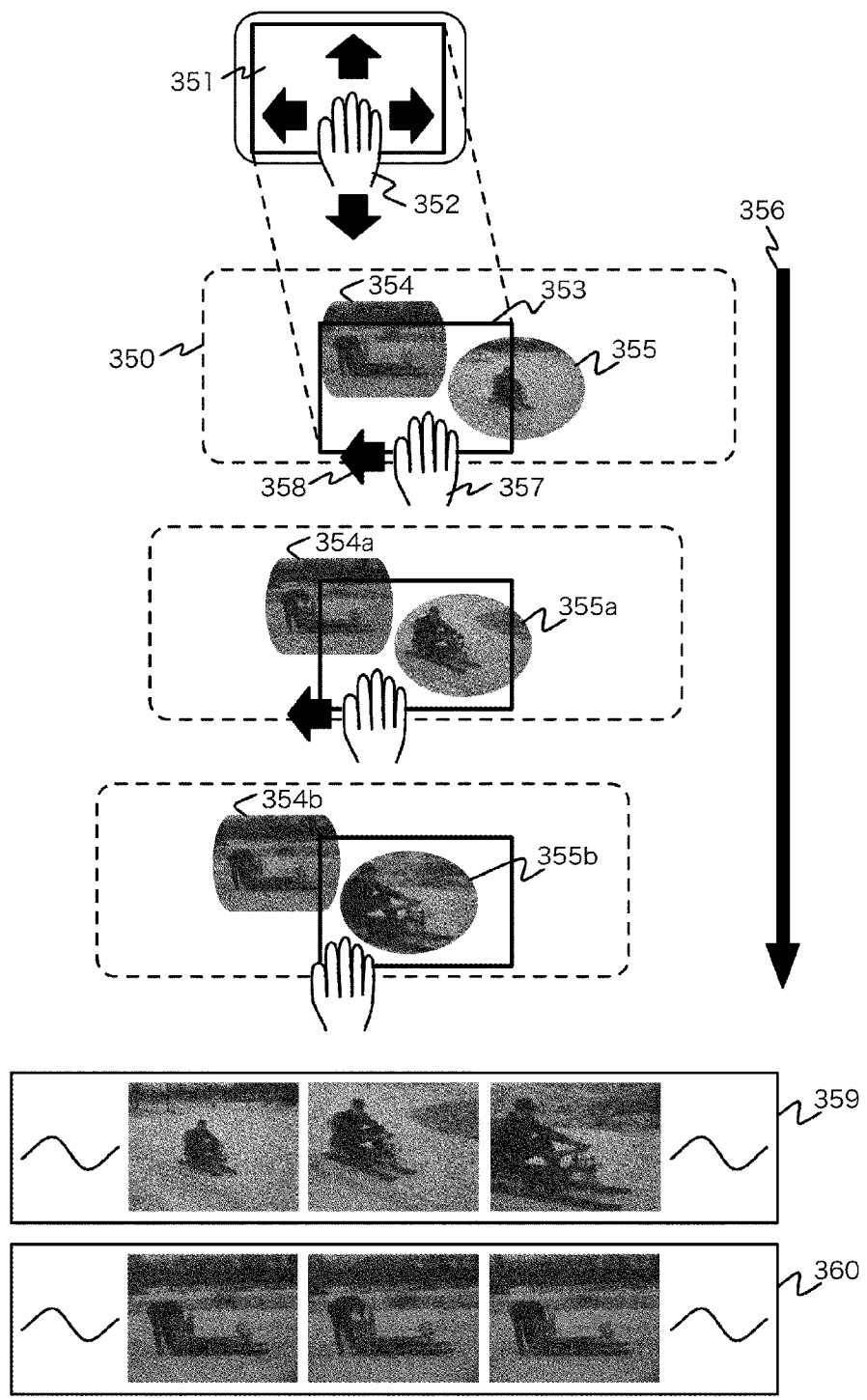
FIG. 7 illustrates an electronic picture book of claim 3 employing video data.

FIG. 7 illustrates an exemplary embodiment of claim 3. Changes to shapes and colors of element images 354 and 355 of FIG. 7 are displayed using recorded video data 359 and 360. The present exemplary embodiment illustrates states in which, along a time axis 356, the element images 354 and 355 selectively display one frame of video data, from out of the mutually different video data 359 and 360, to match the position of the display range 353, due to a display range 353 being moved right due to a touch panel-equipped display 351 being stroked to the left 358 by a hand 357 (354a, 354b, 355a, 355b). In the present exemplary embodiment, rather than the items of video data 359 and 360 being played back so as to match the elapse of time, one frame out of the video data 359 and 360 is selectively displayed to match the position of the display range 353. Selection of frames in coordination with changes to the display range may be designated using an axis similarly to in FIG. 4, for example. In FIG. 4, the frame to be selected in coordination with changes to the display range is gradually modified so as to be the first frame of the video data at the instant of p=0, and so as to be the final frame of the video data at the instant of p=1. This enables a dynamic representation to be achieved in which, when the display range 353 is changed due to the touch panel-equipped display 351 being stroked by the hand 352, a movie appears to be being played back in coordination therewith, and the relationship between the direction and speed of movement of the hand 352 and the speed the movie appears to be played back at (including pausing and reverse playback) differs for each element image.

Figure 8:
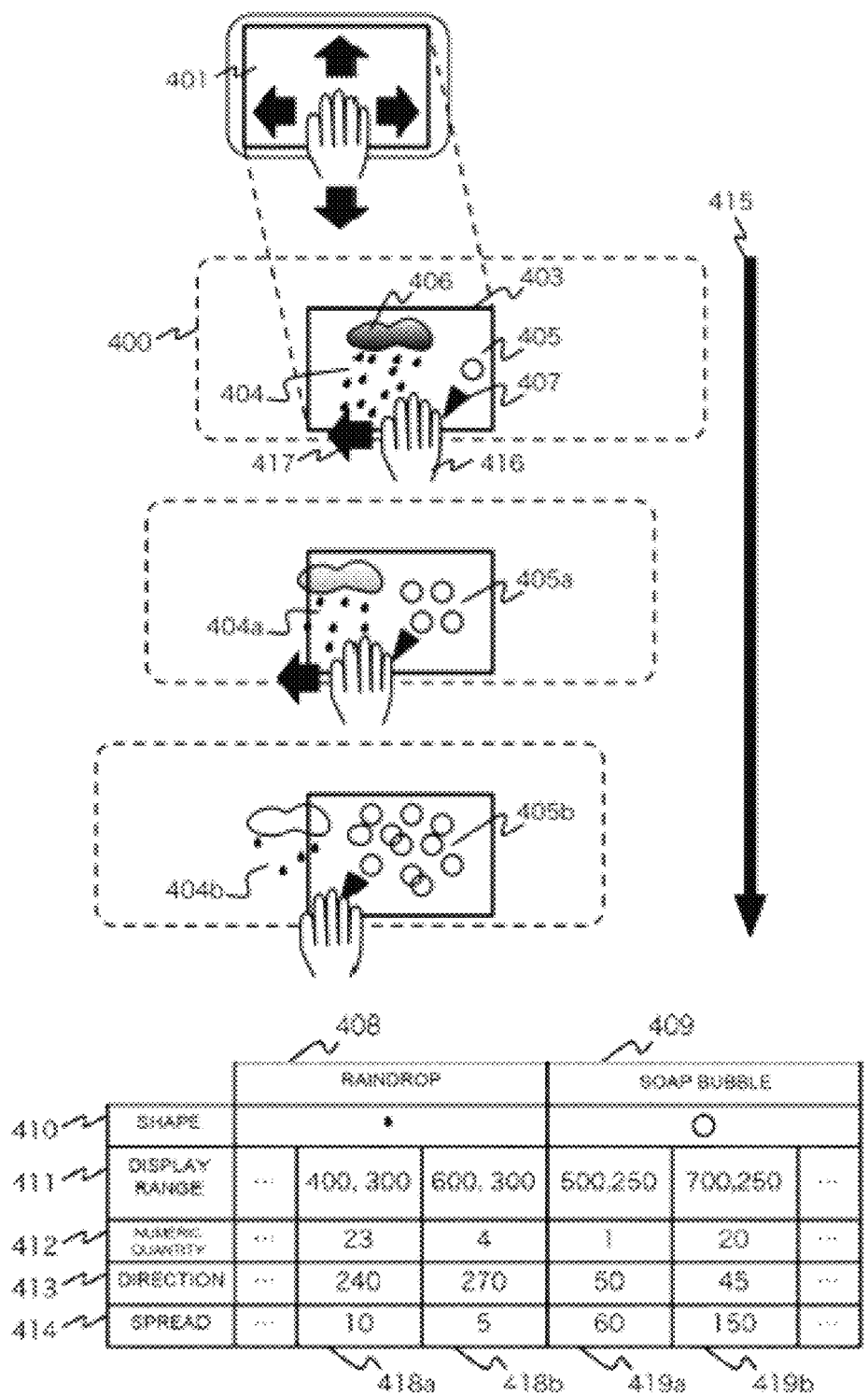
FIG. 8 illustrates an electronic picture book of claim 4 employing a physics simulation.

FIG. 8 illustrates an exemplary embodiment of claim 4. Element images 404 and 405 of FIG. 8 are formed from plural particles, and are displayed using a physics simulation. A feature of the invention is that a physics simulation is used to change variables in coordination with changes in a display range 403 of an electronic picture book 400, and the state in which a video is displayed changes accordingly. In the present exemplary embodiment, a method known as a particle system, which is one method of physics simulation, is employed. Particle systems are employed by many computer graphics generation software products, such as the open source software Blender, and Wikipedia provides an introduction to particle systems on the Internet.

The particle system of the present exemplary embodiment is designated by a special effect of another element image that serves as a parent. Variables 408 of a special effect designated for an element image 406 representing a cloud in FIG. 8, and variables 409 of a special effect designated for an element image 407 representing a tool for making soap bubbles, are each made up of a shape 410, a display range 411, a numeric quantity 412, a direction 413, and a spread 414. Particles 404 and 405 designated by the shapes 410 are generated from the element images 406 and 407 in quantities designated by the numeric quantity 412, and move in directions designated by the directions 413 and the spreads 414. The positions, relative to the element images 406 and 407, from which to generate the particles 404 and 405 having shape 410 are randomly determined. The directions in which to move the particles 404 and 405 having the shape 410 are randomly determined within angle ranges that are designated by the spreads 414, and that are centered on angles designated by the directions 413. The intervals at which the particles 404 and 405 having the shape 410 are generated are short if the value of the numeric quantity 412 is high, and are long if the value of the numeric quantity 412 is low, such that the number of particles 404 and 405 having the shape 410 being displayed at once changes. In the present exemplary embodiment, out of the particle system variables, the numeric quantity 412, the direction 413, and the spreads 414 change in coordination with the display range 403 of the electronic picture book.

The element image 404 represents raindrops, and a state is shown in which, along a time axis 415, the representation 404 having a great number of generated raindrops moves downward and slightly diagonally to the left due to the display range 403 being moved right by stroking a touch panel-equipped display 401 to the left 417 by a hand 416, and then gradually becomes representations 404a and 404b having a small number of generated raindrops that move directly downward. There is accordingly a sequential change, in coordination with the display range 403 of the electronic picture book 400, from the representation 404 in which rain is falling heavily to the representations 404a and 404b of light rain. The element image 405 represents soap bubbles, and a state is shown in which, along the time axis 415, a state 405 in which a small number of generated soap bubbles move upward and slightly to the right due to the display range 403 being moved right by a touch panel-equipped display 401 being stroked to the left 417 by a hand 416, and then gradually becomes representations 405a and 405b in which a great number of generated soap bubbles move in a wide spread of directions. There is accordingly a sequential change, in coordination with the display range 403 of the electronic picture book 400, from the representation 405 in which only a few soap bubbles appear, to the representations 405a and 405b in which many soap bubbles appear and spread out.

Plural values 418a, 418b, 419a, and 419b of variables at plural instants of display range 411 are given as examples in the table at the bottom of FIG. 8. The values of the numeric quantity 412, the direction 413, and the spread 414 are calculated so as to gradually change in coordination with changes to the display range 403. The calculation method may employ linear interpolation or the like as described above. The variables 408 for the physics simulation of raindrops, and the variables 409 for the physics simulation of soap bubbles, respectively designate separate changes that are coordinated with changes to the display range 403.

Figure 9:
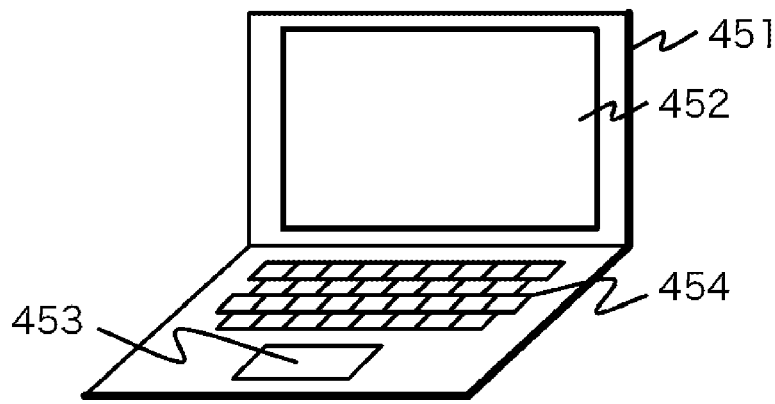
FIG. 9 is an exterior view of an electronic device for producing electronic picture books according to one or more embodiments of the present invention.

FIG. 9 is an example of an exterior of an electronic device for producing electronic picture books of the invention. A display 452, a trackpad 453, and a keyboard 454 are incorporated into a casing 451.

Figure 10:
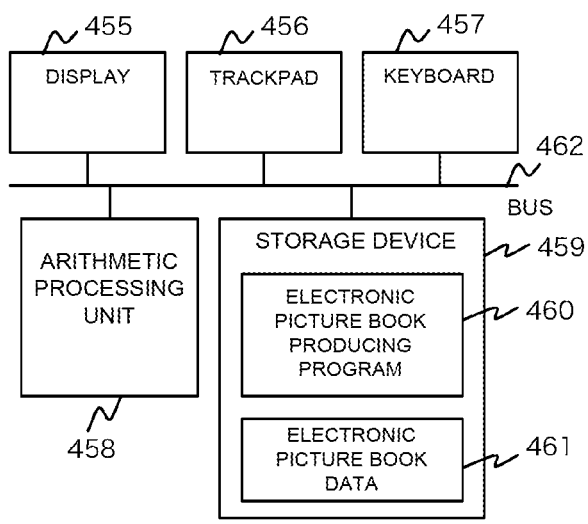
FIG. 10 illustrates a configuration of an electronic device for producing electronic picture books according to one or more embodiments of the present invention.

FIG. 10 is an example of a configuration diagram of an electronic device for producing electronic picture books of the invention. The electronic device includes a display 455, a trackpad 456, a keyboard 457, an arithmetic processing unit 458, and a storage device 459. An electronic picture book producing program 460 and electronic picture book data 461 for implementing the invention are stored in the storage device 459. The display 455, the trackpad 456, the keyboard 457, the arithmetic processing unit 458, and the storage device 459 are connected by, and communicate via, a bus 462. The arithmetic processing unit 458 uses the trackpad 456 and the keyboard 457 to edit element images under instruction by the electronic picture book producing program 460, while displaying the element images included in the electronic picture book data 461 that are being edited on the display 455.

Figure 11:
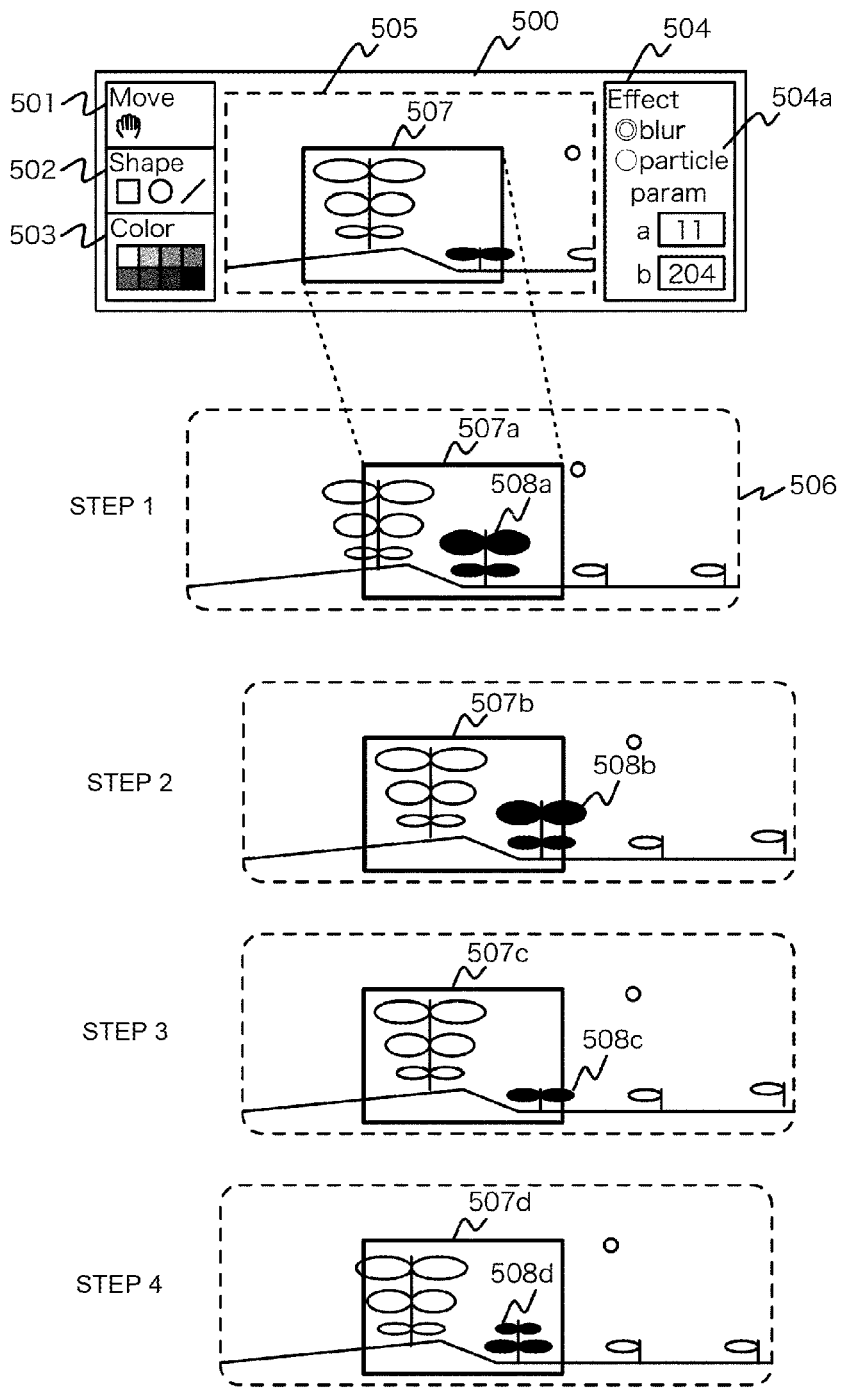
FIG. 11 illustrates a program for producing electronic picture books according to one or more embodiments of the present invention.

FIG. 11 illustrates an exemplary embodiment of claim 5. An editing program 500 made up of respective tools 501 to 504 and an editing area-cum-preview screen 505. A display range 507 of an electronic picture book 506 can be modified by selecting a movement tool 501 and dragging the display range 507 up, down, left, and right using the trackpad 453 while viewing the editing area-cum-preview screen 505. In the invention, first, a display range 507a is determined at step 1 and an element image 508a is drawn. A graphic drawing tool 502, a color designation tool 503, and a special effect designation tool 504 are employed for drawing. Graphics are drawn using the graphic drawing tool 502, colors for the drawn graphics are designated using the color designation tool 503, and special effects for the drawn graphics are designated using the special effect designation tool 504. Special effects have variables that depend on the type of effect, and values are designated for those variables. When a particle system 504a has been chosen, the shape 410, the numeric quantity 412, the direction 413, and the spread 414, as illustrated in FIG. 8, are designated as variables. Out of the variables, the display range 411 is set to the value of the display range 507a designated using the editing area-cum-preview screen 505. Next, at step 2, the display range is moved (507b). When this is performed, the shape, color, and special effect of an element image 508b are the same as in step 1. Next, at step 3, the shape, color, and special effect of an element image 508c in a display range 507c are designated. The display range 507b of step 2 and the display range 507c of step 3 are the same. If a display range 507d at step 4 is between those of step 1 and step 3, then an element image 508d adopts a shape, color, and special effect obtained by interpolating the shapes, colors, and special effects drawn at step 1 and step 3. The interpolation is performed by the linear interpolation method illustrated in FIG. 4.

Figure 12:
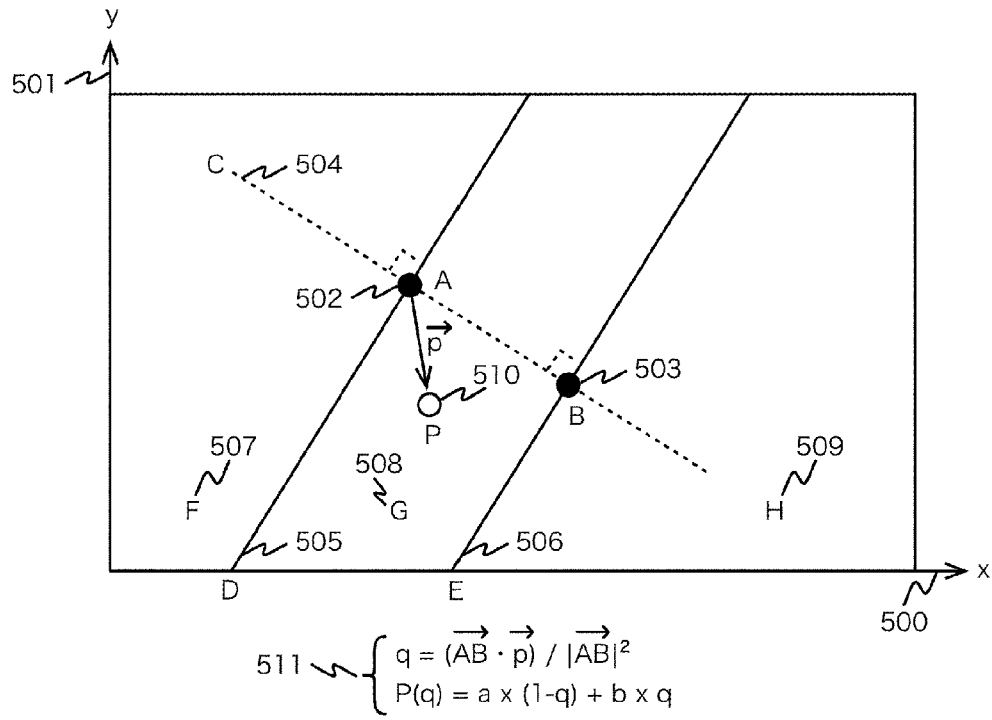
FIG. 12 illustrates an interpolation method (1) when shapes, colors, and special effects, including a physics simulation, of an element image have been designated for plural display ranges according to one or more embodiments of the present invention.
Figure 13:
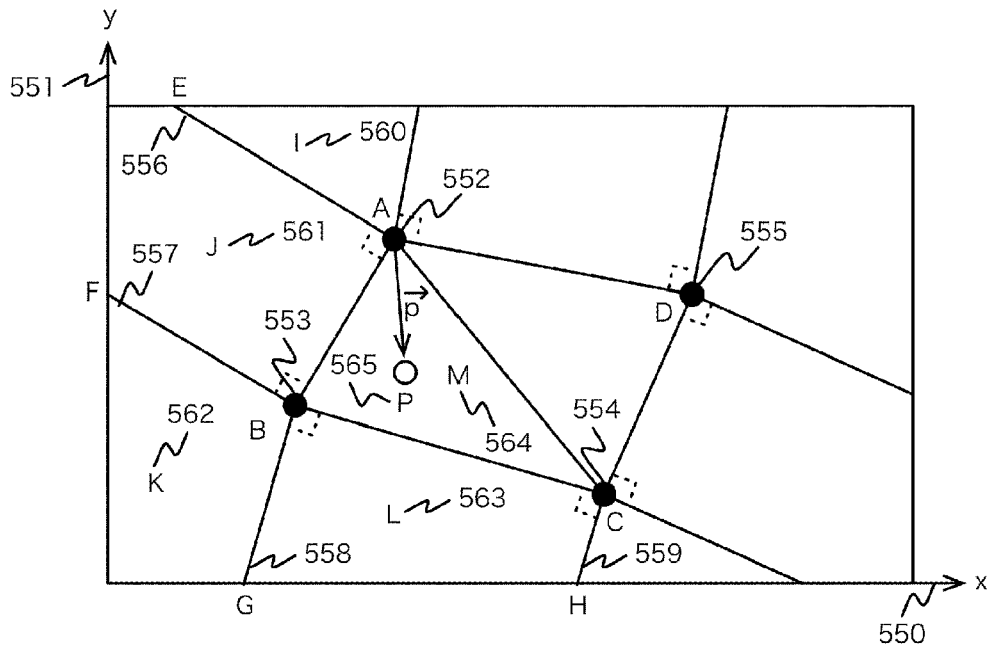
FIG. 13 illustrates an interpolation method (2) when shapes, colors, and special effects, including a physics simulation, of an element image have been designated for plural display ranges according to one or more embodiments of the present invention.

FIG. 12 and FIG. 13 illustrate details of the interpolation method when shapes, colors, and special effects have been designated for an element image in plural display ranges. FIG. 12 illustrates a method of interpolating an element image between two display ranges, and FIG. 13 illustrates a method of interpolating an element image between three or more display ranges. Coordinates x, y (500, 501, 550, 551) illustrate center points of display ranges on the electronic picture book.

In FIG. 12, two positions, A 502 and B 503, are joined by a straight line C 504, and straight lines D 505, E 506 respectively pass through A 502 and B 503 and are orthogonal to the straight line C 504. This yields three regions F 507, G 508, and H 509 that are partitioned by the straight lines D 505 and E 506. When the center of the display range is in the region F 507, the element image has a shape, color, and special effect designated by position A 502. When the center of the display range is in the region H 509, the element image has a shape, color, and special effect designated by position B 503. When the center of the display range is in the region G 508, the element image has a shape, color, and special effect obtained by linear interpolation between the shape, color, and special effect designated by position A 502 and the shape, color, and special effect designated by position B 503. The shape, color, and special effect when at the position P 510 is expressed by P(q) of an equation 511. Note that a and b are numeric values representing the shape, color, and special effect when at the positions A 502 and B 503, respectively. The value q is 0 when P 510 is on the straight line D 505, is 1 when P 510 is on the straight line E 506, and sequentially changes from 0 to 1 when between the straight line D 505 and the straight line E 506.

In FIG. 13, an element image is designated for four display ranges at positions A 552, B 553, C 554, and D 555, and interpolation is performed between these positions. The straight lines E 556 and F 557 are orthogonal to a straight line AB, and straight lines G 558 and H 559 are orthogonal to a straight line BC. When the center of the display range is in a region I 560, the element image adopts the shape, color, and special effect designated at the position A 552, and when the center of the display range is in a region K 562, the element image adopts the shape, color, and special effect designated at the position B 553. When the center of the display range is in a region J 561, the element image is arrived at by linear interpolation performed between the shape, color, and special effect designated at the position A 552 and the shape, color, and special effect designated at the position B 553. When the center of the display range is in a region L 563, the element image is arrived at by linear interpolation performed between the shape, color, and special effect designated at the position B 553 and the shape, color, and special effect designated at the position C 554. These interpolations are performed using the same method as in FIG. 12. When the center of an element image is in a region M 564, the element image is arrived at by linear interpolation performed between the shapes, colors, and special effects designated at three locations, positions A 552, B 553, and C 554. The shape, color, and special effect when at the position P 565 are represented by P(t, u) of an equation 567. The variables t and u are obtained by decomposing a vector p into a vector AB and a vector AC. Note that a, b, and c are numeric values that indicate the shapes, colors, and special effects when at positions A 552, B 553, and C 554.

Figure 14:
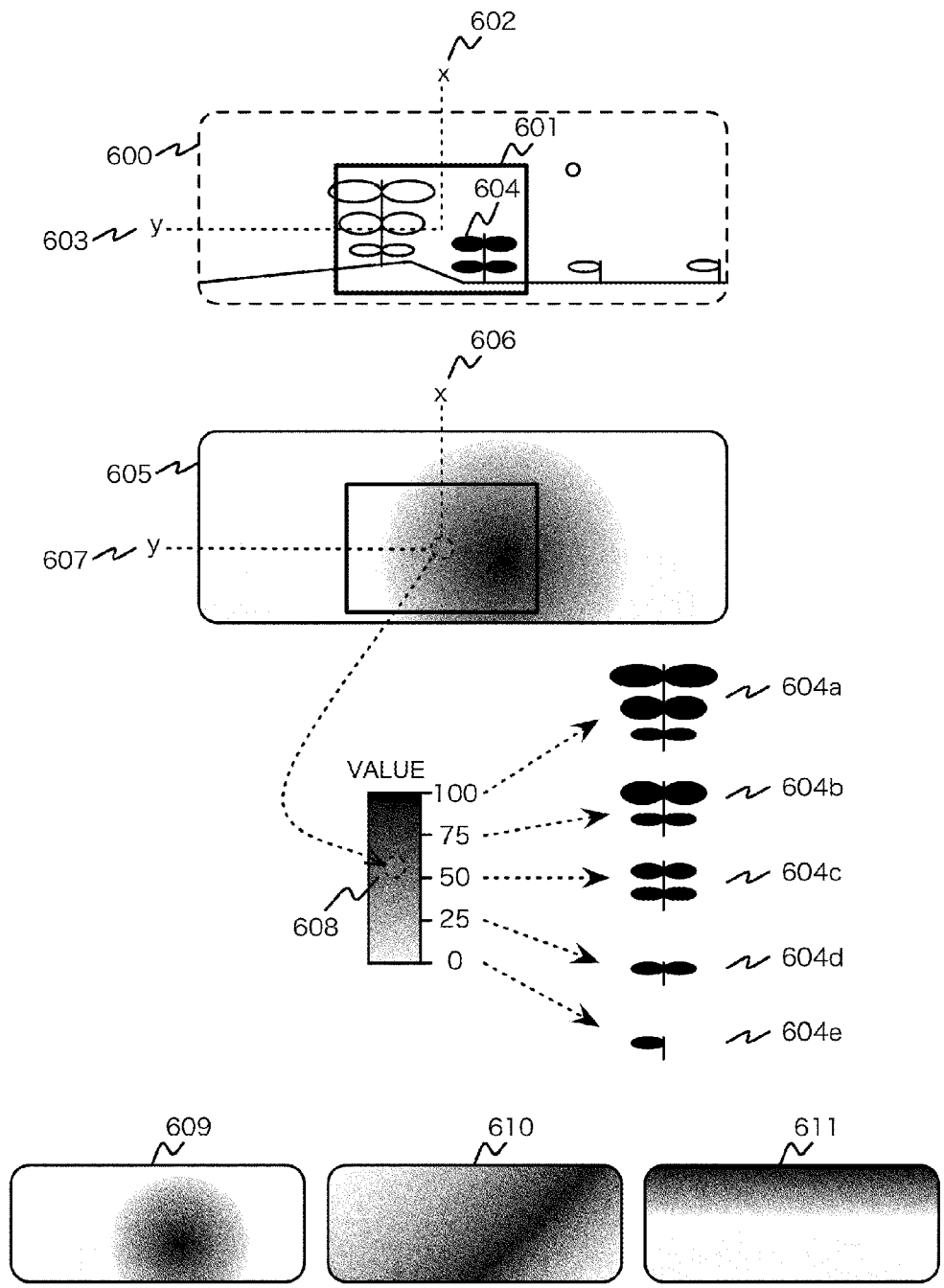
FIG. 14 illustrates a program for producing electronic picture books according to one or more embodiments of the present invention.

FIG. 14 illustrates an exemplary embodiment of claim 6. The present exemplary embodiment has functionality to designate a function for converting two-dimensional vertical-horizontal position information 602 and 603 of a display range 601 of an electronic picture book 600 into a single variable value, and changes to the element image 604 are designated in one dimension in accordance with changes to the display range 601. A density map 605 of FIG. 14 illustrates a function for converting two-dimensional vertical-horizontal position information 606 and 607 into a single variable value 608. The density map 605 of the present exemplary embodiment obtains a value from 0 to 100 in accordance with the position. When the value on a horizontal axis of the display range 601 of the electronic picture book 600 is x 602, and the value on the vertical axis is y 603, a value 608 is obtained for an equivalent position on the density map 605, at x 606 on the horizontal axis and y 607 on the vertical axis. Then the value 608 is employed to designate changes to element images 604a to 604e. The density map 605 can be produced with a freely selected shape, enabling the simple designation of changes to the element images 604 and 604a to 604e in coordination with complex changes vertically and horizontally in the display range 601. FIG. 14 illustrates various density map examples 609, 610, and 611.

FIG. 15 illustrates an exemplary embodiment of claim 7. Element images 650a to 650l are displayed in two dimensions, in which changes with the elapse of time illustrated on the horizontal axis, and changes depending on the display range illustrated on the vertical axis. A time axis 651 and a display range axis 655 are connected to the element images 650a to 650l by arrows, illustrating which position on each of the axes corresponds to which column and row of the element images 650a to 650l. The time axis 651 represents the elapse of time from left to right, and loops by returning from the right end to the left end. Movement of a position 652 on the time axis is started using a playback button 653, and the movement is paused by a pause button 654. The display range axis 655 indicates a value 656 obtained by converting the two-dimensional position of the display range into a single variable value using the method illustrated in FIG. 14. A case is illustrated here in which the lowest variable value is 0 and the highest variable value is 100. Based on the position 652 on the time axis and the position 656 on the display range axis, an element image is displayed in a preview and editing region 657 either with one shape, color and special effect from out of those of the element images 650a to 650l, or with a shape, color, and special effect obtained by interpolating two or four of those of the element images 650a to 650l. In the example of FIG. 15, an element image obtained by interpolating the shapes, colors, and special effects of four element images 650e, 650f, 650i, and 650j is displayed in the preview and editing region 657. The interpolation is performed using the method illustrated in FIG. 6. When one out of the element images 650a to 6501 displayed in two dimensions has been selected, that element image is displayed in the preview and editing region 657 as an editable element image. Editing is performed using various tools 501 to 504 similar to those of FIG. 11. Changes to element images, which are coordinated with both the elapse of time and changes to the display range, can be designated simply by respectively editing the element images 650a to 650l displayed in two dimensions.

A format of the electronic picture book data 107 and 461 of FIG. 2 and FIG. 10 is illustrated by FIG. 16 to FIG. 20. FIG. 16 to FIG. 20 are actually continuous, but the figures have been divided to suit the pages. In the present exemplary embodiment, the electronic picture book data is written in the open standard XML format. Specifications and recommendations for the XML format are made by the World Wide Web Consortium (W3C). In the present exemplary embodiment, data enclosed by the <scroll_picture> tag 700 of FIG. 16 represents a single electronic picture book. Plural <element> tags 701 are contained inside the <scroll_picture> tag 700, and each represents a single element image. A single <variate_type> tag 702 and plural <variation> tags 704 are contained inside each <element> tag 701. The <variate_type> tags indicate methods to designate changes to the element image coordinated with the display range, and the plural <variation> tags each indicate a shape, color, and special effect of the element image when at each display range.

The first half of FIG. 16 illustrates an exemplary embodiment of claim 8, and the latter half illustrates an exemplary embodiment of claim 9. As illustrated in the first half of FIG. 16, in a case 703 in which the <variate_type> tag 702 contains "control_point_still", a single <scroll_position> tag and plural <shape> tags and <color> tags are contained inside the <variation> tag 704. The <scroll_position> tag 705 indicates a display range, and two numeric values 706 indicate an x-axis value and a y-axis value for the display range of the electronic picture book. The <shape> tag 713 indicates the shape of the element image when the display range has been designated by the <scroll_position> tag 705. The <shape> tag 713 enumerates plural pairs of numeric values (715), represented as a row of coordinates in the following manner: x0, y0, x1, y1, and so on. Joining these coordinates together yields the shape of the element image. The <shape> tag 713 has an id attribute 714, and <shape> tags 713, 713a that have the same id and are respectively contained in plural <variation> tags are associated with each other, causing the shape to sequentially change via interpolation in coordination with changes to the display range. The <color> tag 710 indicates a color of an element image when the display range has been designated by the <scroll_position> tag 705. Three numeric values 712 of the <color> tag 710 respectively indicate values for three primary colors: red, green, and blue. In the present exemplary embodiment, colors are each designated by a value in a range of from 0 to 100. The <color> tag 710 also has the same id attribute 711 as the <shape> tag, and plural <color> tags 710 and 710a that have the same id and are respectively included in plural <variation> tags are associated with each other, causing the color to sequentially change via interpolation in coordination with changes to the display range. The <shape> tag 713 and the <color> tag 710 are ordered such that the shape designated by the <shape> tag 713 is drawn in the color designated by the immediately preceding <color> tag 710. Moreover, a single <effect> tag 707 may be contained inside the <variation> tag 704. The <effect> tag 707 has a first value 708 that designates a type of special effect, and has a second values 709 onwards that designate values of variables determined for each type of special effect, and thus indicates a special effect applied to the element image. Values of variables of <effect> tags 707 and 707a respectively contained in plural <variation> tags are sequentially changed via interpolation of values in coordination with changes to the display range. Examples of the special effects include a brush effect, and a particle system, described below. These formats realize the electronic picture book of claim 1, and the producing program of claim 5.

As illustrated in the latter half of FIG. 16, in a case 722 in which a <variate_type> tag 721 is "density_map_still", a <map> tag 723 is contained inside an <element> tag 720, and a single <map_value> tag 726 is contained inside the <variation> tag 725 instead of the <scroll_position> tag. The <map> tag 723 indicates a density map that serves as a function for converting two-dimensional position information of the display range into a single variable value. In the present exemplary embodiment, the density map is designated using a two-dimensional greyscale image file 724. The <map_value> tag 726 indicates a variable value 727 converted using the density map. The values of <shape> tags 730 and 730a, <color> tags 729 and 729a, and <effect> tags 728 and 728a contained in plural <variation> tags 725 and 725a have different values of the <map_value> tag 726, 726a and the shape, color, and special effect of the element image are sequentially changed via interpolation in coordination with changes to the variable values. Cases in which the <variate_type> tag is "control_point_still" and "density_map_still" differ in that, in the former case, the values of the shape, color, and special effect of the element image are computed by comparison of the display range of the electronic picture book against the value of the <scroll_position> tag, and in the latter case, the values of the shape, color, and special effect of the element image are computed by comparison of the variable value obtained by converting the display range into a variable value using the density map designated by the <map> tag 723 against a value 727 of the <map_value> tag. In either case, the <shape> tag, the <color> tag, and the <effect> tag operate in the same manner. These formats realize the producing programs of claim 1 and claim 6.

FIG. 17 illustrates an exemplary embodiment of claim 10. In a case 742 in which the <variate_type> tag 741 contains "control_point_movie" as illustrated in FIG. 17, a <duration> tag 743 is contained inside an <element> tag 740, and a single <scroll_position> tag 746, a single <time> tag 748, plural <shape> tags, and plural <color> tags are contained inside a <variation> tag 745. The <duration> tag 743 represents a length 744, in units of milliseconds, of a time series when the element image changes in coordination with the elapse of time. The element image is played back in a loop over the time interval 744 designated by the <duration> tag 743. Moreover, a single <effect> tag 750 may be included inside the <variation> tag 745. Similarly to cases in which the <variate_type> tag 741 is "control_point_still", a <shape> tag 752, a <color> tag 751, and the <effect> tag 750 indicate the shape, color, and special effect of the element image. These indicate the shape, color, and special effect of the element image at a display range 747 designated by the <scroll_position> tag 746 when the elapsed time 749 has been designated by the <time> tag 748. The <time> tag 748 indicates the elapsed time 749 in milliseconds. When the shape, color, and special effect of the element image are designated by plural <variation> tags 745, and 745a to 745c, the shape, color, and special effect of the element image are sequentially changed via interpolation in coordination with changes to the display range, while also being changed in coordination with the elapse of time. These formats realize the electronic picture book of claim 2.

FIG. 18 illustrates an exemplary embodiment of claim 11. In a case 762 in which the <variate_type> tag 761 contains "density_nap_movie" as illustrated in FIG. 18, a <map> tag 763 and a <duration> tag 764 are contained inside an <element> tag 760, and a single <map_value> tag 766 and a single <time> tag 767 are contained inside a <variation> tag 765. The <map> tag 763 and the <map_value> tag 766 operate in the same manner to in the case 722 in which the <variate_type> tag 721 is "density_map_still". Moreover, the <duration> tag 764 and the <time> tag 767 operate in the same manner to in the case 742 in which the <variate_type> tag 741 is "control_point_movie". These are the shape, color, and special effect of the element image when the elapsed time 769 has been designated by the <time> tag 767 at the display range having the value 768 of the <map_value> tag 766. When the shape, color, and special effect of the element image have been designated by plural <variation> tags 765 and 765a to 765c, the shape, color, and special effect of the element image are sequentially changed via interpolation in coordination with changes to the display range, and while also in coordination with the elapse of time. These formats realize the electronic picture book of claim 2, and the producing program of claim 7.

The first half of FIG. 19 illustrates an exemplary embodiment of claim 12, and the latter half illustrates an exemplary embodiment of claim 13. As illustrated in the first half of FIG. 19, a single <movie_file> tag 784 is contained inside a <variation> tag 780. The first two numeric values 785 of the <movie_file> tag 784 represent a display position of video data as a value on an x-axis and a value on a y-axis, and the third numeric value 786 indicates a frame number of the video data to be displayed when a display range 782 has been designated by the <scroll_position> tag 781. The frame number is a numeric value starting from 1, indicating the sequence number of frames counting from the start of the video data. The fourth text string 787 indicates the file name of the video data. When plural <variation> tags 780 and 780a each designate a different respective value for the third value indicating frame numbers of <movie_file> tags 784 and 784a, the frame number to be displayed is sequentially changed via interpolation in coordination with changes to the display range. Moreover, special effects can be applied to the frame to be displayed by designating an <effect> tag 783 alongside the <movie_file> tag 784. These formats realize the electronic picture book of claim 3.

Moreover, as illustrated in the latter half of FIG. 19, a <map> tag 791 is contained inside the <element> tag 790, and a single <map_value> tag 793 and a single <movie_file> tag 794 are contained inside a <variation> tag 792. The <map> tag 791 and the <map_value> tag 793 operate in the same manner to in the cases of FIG. 16 and FIG. 18. These indicate that the frame number to be displayed when the display range has the value of the <map_value> 793 tag by the third value of the <movie_file> tag 794. When there are different respective values designated by plural <variation> tags 792 and 792a for the <map_value> tags 793 and 793a and for the third values indicating the frame number of the <movie_file> tags 794 and 794a, the frame number to be displayed is sequentially changed via interpolation in coordination with changes to the display range. These formats realize the electronic picture book of claim 3, and the producing program of claim 6.

Moreover, <element> tags 800 and 810 illustrate different exemplary embodiments of claim 13. In the present exemplary embodiment, a <map> tag 801 or a <map_func> tag 811 represents a function that converts two-dimensional position information of the display range into a single variable value, and the corresponding variable value indicates frame numbers of the video data indicated by the <movie_file> tags 802 and 812. The value range of the variable value is set to from 0 to 1, and a scale can be set to indicate the first frame of the video data when 0 and the final frame when 1. The <map> tag 801 indicates a density map, similarly to in FIG. 16 and FIG. 18. The <map_func> tag 811 has a first value 813 designating a type of function, and a second value 814 onward that designate constant values of the function determined for each type of function. As an example, FIG. 21 illustrates a function 901 in a case 900 in which the first value of the <map_func> tag 811 is "linear", and a function 904 of a case 903 in which the first value of the <map_func> tag 811 is "oval". Here, x1, y1, x2, y2, w, and h represent constants of functions, x represents the horizontal position of the display range, y represents the vertical position of the display range, and values 902 and 905 represent variable values computed using the functions 901 and 904. The value ranges for the variable values computed by each of the functions of FIG. 21 are from 0 to 1, and scaling is set to indicate the first frame of the video data when 0, and the final frame of the video when 1. Thus, the frame number of the video file to be displayed coordinated with changes to the display range can be designated more concisely, without employing the <variation> tag. These formats realize the electronic picture book of claim 3, and the producing program of claim 6.

The first half of FIG. 20 illustrates an exemplary embodiment of claim 14, and the latter half illustrates an exemplary embodiment of claim 15. As illustrated in the first half of FIG. 20, a particle system effect, which is one example of physics simulation, is applied to the element image by setting a first value 822 of an <effect> tag 821 to "particle". The second numeric value to the fourth numeric value of the <effect> tag 821 respectively indicate particle system variables of numeric quantity 823, direction 824, and spread 825. The fifth value onward of the <effect> tag 821 are an enumeration of plural pairs of numeric values (826), and represent coordinates in a series like x0, y0, x1, y1, and so on. Linking these coordinates yields a shape, which is one of the variables of the particle system. The coordinates are local coordinates, and differ from the coordinates of the electronic picture book. Moreover, a file name 827 of an image file may be designated without enumeration by the fifth numeric value onwards. In such cases, the image of the image file serves as the shape. The variables of the particle system operate as illustrated by FIG. 8. Setting different values for second values onward of <effect> tags 821 and 821a respectively contained in plural <variation> tags 820 and 820a, causes the values indicating the variables of the particle system to sequentially change via interpolation in coordination with changes to the display range. These formats realize the electronic picture book of claim 4 and the producing program of claim 5.

As illustrated in the latter half of FIG. 20, a single <map_func> tag 841 is contained inside an <element> tag 840, and a single <map_value> tag 843 is contained inside a <variation> tag 842. The <map_func> tag 842 and the <map_value> tag 843 operate in the same manner as in the cases of FIG. 19 and FIG. 21. When different values are designated, in plural <variation> tags 842 and 842a, for <map_value> tags 843 and 843a, and for the second values onward of the <effect> tags 844 and 844a representing variables of the particle system, the numeric quantity, direction, and spread variables of the particle system are sequentially changed via interpolation in coordination with changes to the display range. These formats implement the electronic picture book of claim 4, and the producing program of claim 6.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A non-transitory computer-readable medium comprising computer-executable instructions for an electronic picture book, which, when executed by a processor, cause a computing device to perform a method, the method comprising:
 displaying a partial range of an overall image of the electronic picture book on a screen, and
 changing a display range as if the overall image is being moved vertically or horizontally due to the screen being stroked by a hand, wherein:
  the overall image is configured by a plurality of element images;
  shapes or colors of the plurality of element images continuously change in coordination with change to the display range; and
  a manner and an extent of the change differ depending on the element image by synchronizing each continuous change of the change such that during continuous change, the shape or color of the element image is uniquely determined at the display range, wherein data representing the electronic picture book includes a plurality of data representing the plurality of element images, and each respective item of data representing the plurality of element images includes data indicating a function for converting vertical-horizontal two-dimensional position information of the display range into a single variable value, and a plurality of sets that each include data indicating a variable value obtained by converting using the function and data indicating a shape or color of an element image when at that variable value.

2. The non-transitory computer-readable medium comprising computer-executable instructions for the electronic picture book of claim 1, wherein:
 the plurality of element images have respective shapes or colors that change with the elapse of time, and the respective shapes or colors also undergo a different change in coordination with change to the display range, and a manner and an extent of these changes differ depending on the element image by synchronizing each continuous change of these changes such that during continuous change, the shape or color of the element image is uniquely determined at the display range.

3. The non-transitory computer-readable medium comprising computer-executable instructions for the electronic picture book of claim 2, wherein data representing one electronic picture book includes a plurality of data representing element images, and each respective item of data representing the element images includes data indicating a function for converting vertical-horizontal two-dimensional position information of a display range into a single variable value, and a plurality of sets that each include data indicating a variable value obtained by converting using the function, data representing an elapsed time, and data indicating a shape or color of an element image when at that variable value at that elapsed time.

4. The non-transitory computer-readable medium comprising computer-executable instructions for the electronic picture book of claim 1, wherein:
 the plurality of element images are made from video data that records changes to shapes or colors for each element image separately, frames are continuously selected and displayed in coordination with change to the display range, and the manner of synchronizing the selected frame with the display range differs depending on the element image by synchronizing each continuous change of the selection such that during continuous change, the frame to be selected is uniquely determined at the display range.

5. The non-transitory computer-readable medium comprising computer-executable instructions for the electronic picture book of claim 4, wherein data representing one electronic picture book includes a plurality of data representing element images, and each respective item of data representing the element images includes data designating video data, and data representing a function for converting vertical-horizontal two-dimensional position information of a display range into a single variable value, and the variable value obtained by converting using the function represents a frame position of the video data to be displayed.

6. A non-transitory computer-readable medium comprising computer-executable instructions for an electronic picture book, which, when executed by a processor, cause a computing device to perform a method, the method comprising:
displaying a partial range of an overall image of the electronic picture book on a screen, and
changing a display range as if the overall image is being moved vertically or horizontally due to the screen being stroked by a hand, wherein:
the overall image is configured by a plurality of element images;
shapes or colors of the plurality of element images continuously change in coordination with change to the display range; and
a manner and an extent of the change differ depending on the element image by synchronizing each continuous change of the change such that the shape or color of the element image is uniquely determined at the display range;
the plurality of element images have respective shapes or colors that change in coordination with change to the display range, and a manner and an extent of these changes differ depending on the element image by synchronizing each continuous change of these changes such that the shape or color of the element image is uniquely determined at the display range, and wherein:
the plurality of element images each have respective shapes or colors that separately change with the elapse of time in accordance with a physics simulation, a value of a variable employed in a calculation of the physics simulation changes in coordination with change to the display range, and a manner and extent of the change to the value of the variable differs depending on the element image by synchronizing each continuous change to the value of the variable such that the value of the variable is uniquely determined at the display range.

7. The non-transitory computer-readable medium comprising computer-executable instructions for the electronic picture book of claim 6, as represented by a data structure or employed by a program that produces the electronic picture book, wherein in the data structure, data representing one electronic picture book includes a plurality of data representing element images, and each respective item of data representing the element images includes a plurality of sets that each include data indicating a display range, and data indicating a value of a variable employed by a calculation in a physics simulation of the element image when at that display range.

8. The non-transitory computer-readable medium comprising computer-executable instructions for the electronic picture book of claim 6, wherein data representing one electronic picture book includes a plurality of data representing element images, and each respective item of data representing the element images includes data representing a function for converting vertical-horizontal two-dimensional position information of a display range into a single variable value, and a plurality of sets that each include data indicating a variable value obtained by converting using the function and data indicating a value of a variable employed by a calculation in a physics simulation of the element image when at that variable value.

9. A non-transitory computer-readable medium comprising computer-executable instructions for an electronic picture book, which, when executed by the processor, cause a computing device to perform a method, the method comprising:
displaying a partial range of an overall image of the electronic picture book on a screen, and
changing a display range as if the image is being moved vertically or horizontally due to the screen being stroked by a hand, wherein:
the overall image is configured by a plurality of element images;
shapes or colors of the plurality of element images continuously change in coordination with change to the display range; and
a manner and an extent of the change differ depending on the element image by synchronizing each continuous change of the change such that the shape or color of the element image is uniquely determined at the display range;
providing a preview screen that enables the display range to be changed and change to element images to be confirmed;
displaying the display range at two or more places on the preview screen and designates shapes or colors of element images for each of the respective display ranges; and
producing the element images so as to continuously change via interpolation there between.

10. The non-transitory computer-readable medium comprising computer-executable instructions for the electronic picture book of claim 9, wherein data representing one electronic picture book includes a plurality of data representing element images, and each respective item of data representing the element images includes a plurality of sets that each include data indicating a display range and data expressing a shape or color of an element image when at that display range.

11. The non-transitory computer-readable medium comprising computer-executable instructions for the electronic picture book of claim 9, wherein data representing one electronic picture book includes a plurality of data representing element images, and each respective item of data representing the element images includes a plurality of sets that each include data indicating a display range, data indicating an elapsed time, and data indicating a shape or color of the element image when at that display range and at that elapsed time.

12. The non-transitory computer-readable medium comprising computer-executable instructions for the electronic picture book of claim 9, wherein data representing one electronic picture book includes a plurality of data representing element images, and each respective item of data representing the element images includes data designating video data, and a plurality of sets that each include data indicating a display range, and data representing a frame position of the video data to be displayed when at that display range.

13. A non-transitory computer-readable medium comprising computer-executable instructions for an electronic picture book, which, when executed by the processor, cause a computing device to perform a method, the method comprising:

displaying a partial range of an overall image of the electronic picture book on a screen, and changing a display range as if the overall image is being moved vertically or horizontally due to the screen being stroked by a hand, wherein:

the overall image is configured by a plurality of element images;

shapes or colors of the plurality of element images continuously change in coordination with change to the display range; and a manner and an extent of the change differ depending on the element image by synchronizing each continuous change of the change such that the shape or color of the element image is uniquely determined at the display range;

including functionality to designate for each element image a function that converts vertical-horizontal two-dimensional position information of the display range into a single variable value; and using the variable value to designate in one dimension a change to the element image due to change to the display range.

14. The non-transitory computer-readable medium comprising computer-executable instructions for the electronic picture book of claim 13, which, when executed by the processor, cause the computing device to perform the method, wherein:

the plurality of element images have respective shapes or colors that change with the elapse of time, and the shapes or colors also undergo a different change in coordination with change to the display range, and a manner and an extent of these changes differ depending on the element image by synchronizing each continuous change of these changes such that the shape or color of the element image is uniquely determined at the display range, the method further comprising:

representing changes to each element image on two axes of an axis indicating elapse of time and an axis indicating the display range;

designating a plurality of places on the two axes;

designating a shape or color for each of the element images; and interpolating in two dimensions formed by the two axes to produce the element images that continuously changes in coordination with both elapsed time and change to the display range.

* * * * *